United States Patent
Blanc et al.

(10) Patent No.: US 8,313,595 B2
(45) Date of Patent: Nov. 20, 2012

(54) PRESSURIZED FLUID TANK AND METHOD AND APPARATUS FOR PRODUCING ONE SUCH TANK

(75) Inventors: Claude Blanc, Villarsiviriaux (CH); Olivier Essinger, La Tour de Peilz (CH); Cesare Stacchi, Fribourg (CH)

(73) Assignees: Michelin Recherche et Technique S.A., Granges-Paccot (CH); Compagnie Generale des Establissements Michelin, Clermont-Ferrand (FR)

( * ) Notice: Subject to any disclaimer, the term of this patent is extended or adjusted under 35 U.S.C. 154(b) by 34 days.

(21) Appl. No.: 12/742,912

(22) PCT Filed: Nov. 13, 2008

(86) PCT No.: PCT/EP2008/065497
§ 371 (c)(1),
(2), (4) Date: Nov. 23, 2010

(87) PCT Pub. No.: WO2009/063019
PCT Pub. Date: May 22, 2009

(65) Prior Publication Data
US 2011/0056960 A1    Mar. 10, 2011

(30) Foreign Application Priority Data
Nov. 13, 2007 (FR) ...................... 07 59003

(51) Int. Cl.
*B65H 81/06* (2006.01)
*B29C 70/86* (2006.01)
*B65D 81/00* (2006.01)

(52) U.S. Cl. ............ 156/69; 156/84; 156/172; 220/590; 220/591

(58) Field of Classification Search .................. 156/69, 156/84, 85, 172; 220/590, 591
See application file for complete search history.

(56) References Cited

U.S. PATENT DOCUMENTS

| | | | | |
|---|---|---|---|---|
| 4,589,562 A | * | 5/1986 | Fawley ................. | 220/590 |
| 4,865,210 A | * | 9/1989 | Brainard, II ........... | 220/590 |
| 5,758,796 A | | 6/1998 | Nishimura et al. | |
| 2003/0111473 A1 | | 6/2003 | Carter et al. | |
| 2004/0026431 A1 | | 2/2004 | Jones | |
| 2004/0206762 A1 | | 10/2004 | Iida et al. | |
| 2006/0096993 A1 | | 5/2006 | Takashima | |

FOREIGN PATENT DOCUMENTS

| | | |
|---|---|---|
| DE | 201 07 628 | 9/2002 |
| DE | 102 43 164 | 5/2003 |
| DE | 10 2006 004 121 | 7/2007 |
| EP | 1 526 324 | 4/2005 |
| EP | 1 593 904 | 11/2005 |
| EP | 1 762 773 | 3/2007 |
| FR | 2 772 459 | 6/1999 |
| GB | 1 150 131 | 4/1969 |
| WO | WO 2006/132394 | 12/2006 |

\* cited by examiner

*Primary Examiner* — Katarzyna Wyrozebski Lee
*Assistant Examiner* — Scott W Dodds
(74) *Attorney, Agent, or Firm* — Cozen O'Connor

(57) ABSTRACT

A tank (1) for storing fluid under high pressure, of cylindrical overall shape and round cross section comprising at each of its ends along its axis (2), a metal end piece (3, 4), a liner (6) enveloping the said end pieces, and a structural layer (7) of fiber impregnated with thermosetting resin enveloping the said liner.

10 Claims, 5 Drawing Sheets

PRESSURIZED FLUID TANK AND METHOD AND APPARATUS FOR PRODUCING ONE SUCH TANK

RELATED APPLICATIONS

This is a U.S. national stage under 35 USC §371 of application No. PCT/EP2008/065497, filed on Nov. 13, 2008.

This application claims the priority of French application no. 07/59003 filed Nov. 13, 2007, the entire content of which is hereby incorporated by reference.

FIELD OF THE INVENTION

The present invention relates to the storage of fluids under pressure. It is notably but not solely applicable to the storage of gaseous hydrogen in a road vehicle, for example a fuel cell vehicle.

BACKGROUND OF THE INVENTION

In this field, one of the difficulties in mass-producing such vehicles is the design of the tanks because the hydrogen tanks carried by these vehicles are subjected to service pressures that may be as high as 700 bar, and have to meet tight safety requirements in order to minimize the consequences of a knock, of an accidental impact, or of a fire. For example, when the tank is damaged in an accident in which the vehicle is involved or when a projectile fired from a fire arm passes through the tank, it is desirable for the tank to release its pressure gradually, without exploding and without tearing significantly. The same is desirable in the event of an increase in the temperature of the gas contained inside the tank as the result of a vehicle fire.

SUMMARY OF THE INVENTION

One object of the invention is to allow such tanks to be obtained on an industrial scale for a reasonable cost, for example at a cost that is acceptable for motor vehicle applications.

This and other objects are attained in accordance with one aspect of the present invention directed to a tank for storing fluid under high pressure, of cylindrical overall shape and round cross section comprising at each of its ends along its axis a metal end piece, a liner enveloping the end pieces, a structural layer of fibre impregnated with thermosetting resin enveloping the liner, each end piece comprising an external bearing surface that bears against the liner, the bearing surface comprising a non-cylindrical part, the internal pressure of the tank having a tendency to clamp the end pieces against the liner.

For preference, each end piece further comprises an elastomer seal placed in an annular groove of the non-cylindrical part of the exterior surface of the end piece, the internal pressure of the tank having a tendency to clamp the end piece against the liner, compressing the seal. For preference, the seal is an O-ring.

For preference, the structural layer is a layer of carbon fibre. For preference too, the tank further comprises an exterior protective layer of glass fibre enveloping the structural layer.

For preference, the structural layer and, where appropriate, the protective layer consists (consist) of a tape of fibres wound around the liner.

For preference, the liner is made of polyamide with a thickness less than or equal to 3 mm, more preferably less than 1.5 mm.

For preference, for each end, a shell ring external to the structural layer and secured to the end piece holds it axially in place.

For preference, for each end, hooping keeps each end of the liner radially clamped against the end piece.

For preference, the outside diameter of the end pieces corresponds substantially to the inside diameter of the tank.

Another aspect of the invention relates to a method of manufacturing a tank of cylindrical overall shape of round cross section for the storage of high-pressure fluids, the tank comprising, about an axis, a liner and a structural layer, the method comprising steps successively involving:
  placing metal end pieces inside a tube intended to form the liner,
  shaping the ends of the tube to the shape of the end pieces by locally reducing the diameter of the tube,
  winding at least one tape of fibre impregnated with thermosetting resin around the liner to form the structural layer of the tank.

For preference, the method further comprises a step that involves placing elastomer seals in annular grooves of the radially exterior surface of the end pieces facing the tube intended to form the liner.

For preference, the method further comprises a step involving placing hooping around the ends of the tube which are formed over the end pieces.

For preference, the method further comprises a step that consists in winding a second tape of fibre impregnated with thermosetting resin around the structural layer to form a protective outer layer of the tank. For preference, the second tape of fibres is married up with the first tape of fibres.

For preference, an internal pressure is maintained in the volume of the preform consisting of the liner and of the end pieces while the tape is being wound.

For preference, axial traction is maintained on the preform consisting of the liner and of the end pieces while the tape is being wound.

For preference, two tapes are simultaneously wound substantially symmetrically with respect to the axis of the preform consisting of the liner and of the end pieces.

For preference, in order to perform the winding, the preform consisting of the liner and of the end pieces is rotated about its axis, the preform being held by the end pieces, the tapes being guided by a mobile means able to move parallel to the axis of the preform.

For preference, the axis of the preform is kept substantially horizontal during winding.

Another aspect of the invention relates to an apparatus for winding a tape of fibres around a preform of cylindrical overall shape of round cross section comprising:
  a rotary support able to hold the preform by its ends,
  means of rotating the rotary support about the axis of the preform,
  a feed device for feeding resin-impregnated fibre tape,
  means for moving the feed device parallel to the axis of the preform.

For preference, the fibre tape feed device comprises a device for impregnating the tape with liquid resin.

For preference too, the impregnation device uses at least one cascade of liquid resin arranged such that the tape passes through it.

For preference too, the impregnation device uses several cascades arranged in such a way that the tape passes through them in turn.

For preference, the tape emerges from the impregnation device via an eyelet able to guide the tape for winding around the preform.

For preference, the rotary support allows axial tension to be applied to the preform.

For preference, the rotary support allows a gas pressure to be maintained inside the preform.

For preference, the apparatus further comprises a second device for feeding fibre tape. For preference too, the second tape feed device is arranged symmetrically to the first feed device in relation to the axis of the preform.

DETAILED DESCRIPTION OF THE INVENTION

Figure 1:
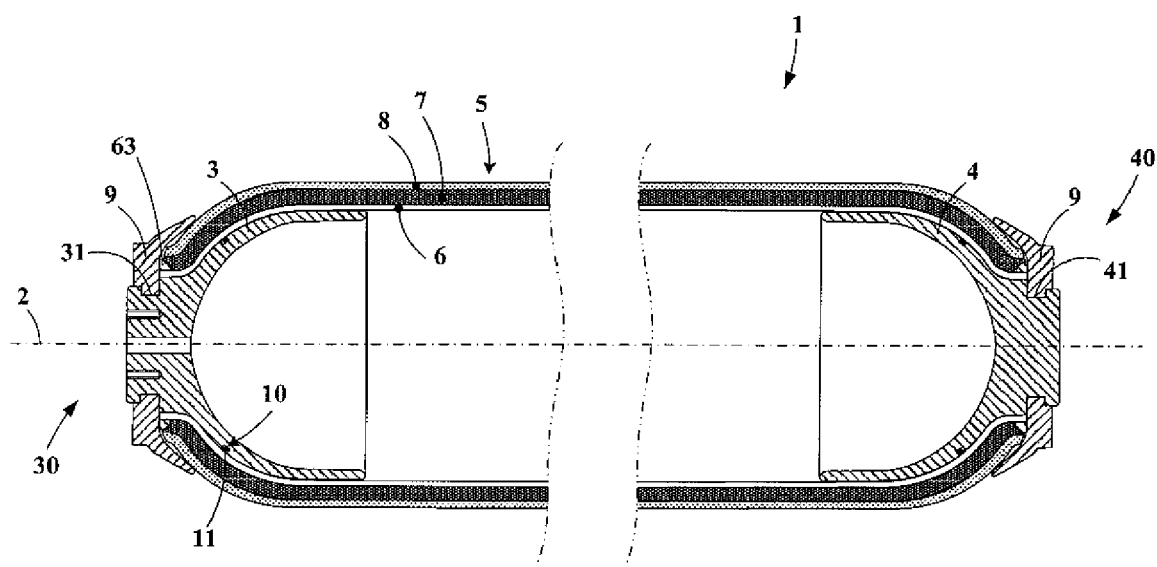
FIG. 1: a partial cross section of a tank according to an embodiment of the invention.

FIG. 1 is a cross section through a tank 1 of cylindrical overall shape of round section about an axis 2. FIG. 1 is interrupted at the middle of the tank because the length may be very long in comparison with the diameter, for example 10, 20 or 30 times greater. Each end of the tank has an end piece, preferably made of metal, for example made of aluminium alloy. The first end piece 3 constitutes an inlet/outlet interface 30 of the tank and the second end piece 4 constitutes the end wall 40 of the tank. The end wall 4 may naturally also have an inlet/outlet interface. A composite wall 5 extends axially from one end piece to the other. The wall comprises an internal sealing layer (generally known as a "liner") 6, for example made of polyamide (nylon), and a structural layer of resin-saturated fibres. The liner 6 is not very thick at all, and preferably of a thickness less than or equal to 3 mm, for example of 1 mm. The structural layer here is made up of a layer of carbon fibres 7. In this case, an exterior protective layer 8 of glass fibres protects the structural carbon layer. The carbon and glass layers are saturated with resin, for example epoxy resin. Of course, other types of fibre such as aramid fibres for example can be used in place of one or other of the aforementioned fibres, depending on the target performance, mass and costs.

An elastomer seal 11, for example an O-ring, placed in an annular groove 10 of the radially exterior surface of each piece, provides sealing between the end pieces 3, 4 and the liner 6. The bearing surface via which the end piece bears against the liner at the seal is not cylindrical. In this instance it is inclined with respect to the axis of the tank by about 45°. It will be appreciated that the internal pressure of the tank therefore has a tendency to clamp the liner against the seal because it presses the end pieces axially outwards. More specifically, the internal pressure acts on the central part of the end piece, radially as far as the seal 11 against the exterior atmospheric pressure. In the case of the peripheral part of the end piece (radially beyond the seal), the internal pressure acts on the two faces of the end piece and therefore does not generate any force directly on this peripheral part.

One effect of this arrangement of the seal in a non-cylindrical part of the end piece is that the axial force generated by the pressure tends to keep the annular groove 10 closed and therefore prevent the O-ring from being extruded. This effect is obtained once the inclination of the bearing surface with respect to the axis of the tank becomes significant. In the extreme, an inclination at 90°, that is to say a configuration in which the end pieces are flat in the region of the seal, would generate maximum effect from this standpoint.

The funnel shape of the end pieces 3 and 4 depicted here is a preferred shape because it allows the end pieces, as described above, to bear directly against the internal face of the composite wall and provide an excellent seal against this internal face, that is to say against the liner. As depicted here, the shape of the end pieces in their transition zone (that is to say in this instance on each side of the seal) is also preferably substantially hemispherical so as best to distribute the stresses experienced by the end pieces and by the composite wall.

As depicted in the figures, the end pieces extend axially preferably as far as the cylindrical part of the tank. Thus, the outside diameter of the end pieces corresponds substantially to the inside diameter of the tank.

As an alternative to the embodiment depicted, the liner may be bonded or moulded to the metal of the end piece, which means that the seal and the corresponding groove can be omitted. In such a case, non-metal end pieces, for example ones made of polyamide, could also prove attractive.

For preference, shell rings 9, held in grooves (31 and 41 respectively) of the first and second end pieces, hold the end pieces axially in position when there is no internal pressure or when the pressure is not high enough to prevent the end piece from shifting in the event of an axial knock for example. The shell rings (or at the very least one of them) can also be used to attach the tank to the vehicle and/or to the circuit it supplies.

The length and diameter of the tank may vary, particularly according to the space available in the vehicle for which the tank is intended.

One advantage of the liner made of polyamide (or of any other compatible material) which melts before excessively high temperatures are reached, is that it affords intrinsic safety in the event of a fire. Subjected to flames, the tank according to the invention ends up releasing the gas of its own accord, without causing an explosion.

FIGS. 2 to 8 illustrate the essential successive steps of a method of manufacture according to an embodiment of the invention.

Figure 2:
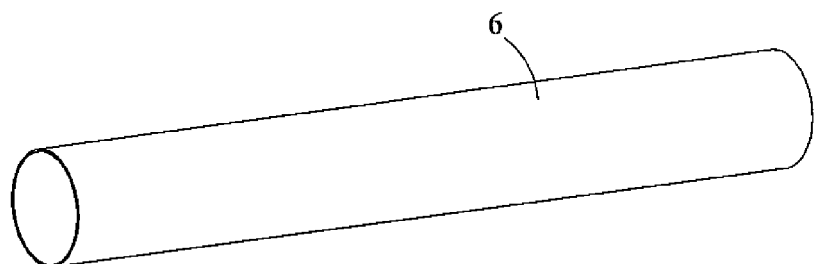
FIG. 2: a perspective view of the tube intended to form the liner of the tank of FIG. 1.

FIG. 2 shows a tube of circular cross section cut to length and intended to form the liner 6 of the tank. It is made of an impervious material, inert in the presence of pressurized hydrogen, and compatible with the other constituent components of the composite wall. Polyamide 6 (PA6) is well suited to this use.

Figure 3:
FIGS. 3 to 8: views successively showing various steps in the manufacture of the tank according to an embodiment of a method of the invention.

FIG. 3 shows how the end pieces 3 and 4 are then positioned inside the ends of the polyamide tube. For preference, the outside diameter of the end pieces corresponds substantially to the inside diameter of the tube, that is to say to the inside diameter of the tank. Where appropriate, the O-rings 11 are placed in the corresponding annular grooves 10 in the end pieces.

Figure 4:

In FIG. 4, the ends of the tube 61 and 62 are shaped onto the end pieces. This result may be achieved by flow turning, by cold or hot shaping or by any other applicable method according, in particular, to the chosen thickness of the liner. In this application, the object in FIG. 4 consisting of the liner 6 and of the end pieces 3 and 4 is known as the "preform".

According to one preferred embodiment of the invention, hooping 63 is then positioned around the shaped liner so as, on the one hand, to guarantee the position of its edge and, on the other hand, to encourage the transmission of load between the end piece and the liner for the winding operation that will follow. Knurling the corresponding surface of the end piece further enhances these hooping effects.

Figure 5:
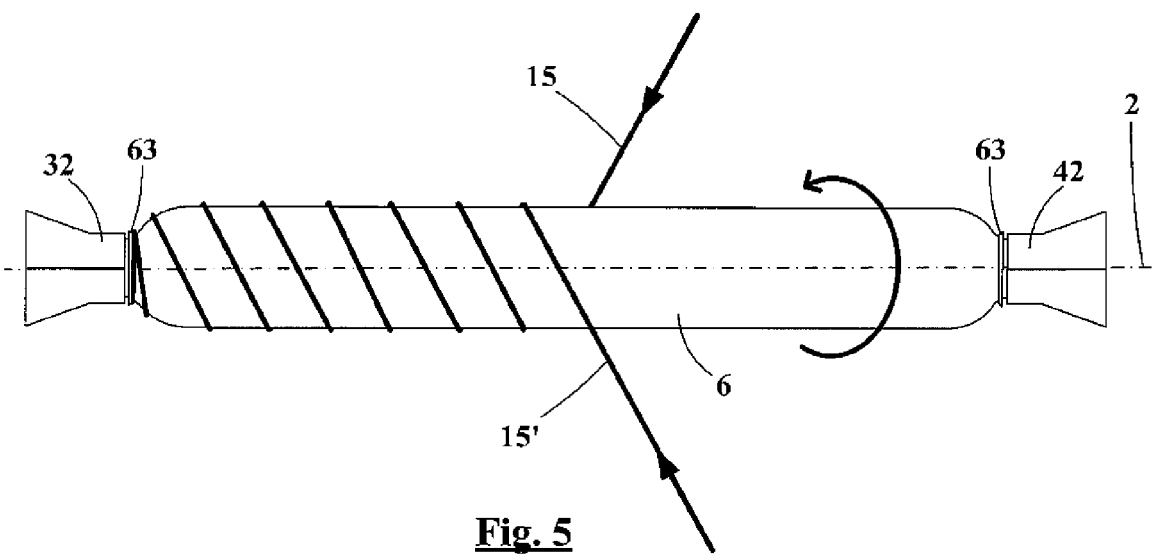

In FIG. 5, the tank preform is placed in a winding machine. The end pieces are held by rotary chucks 32 and 42. The structural layer and, where appropriate, the protective layer, that is to say in this instance the layers of carbon and glass fibre, are then progressively wound. To do that, tapes 15 and 15' comprising a great many parallel fibres are wound. It is the rotation of the chucks which drives the tapes, the tapes being fed under controlled tension. The tapes are impregnated with thermosetting resin, for example epoxy resin, before they are wound onto the preform. For preference, as described below with reference to the winding apparatus, the tapes are impregnated by passing through one or more cascades of resin. Two tapes are wound simultaneously from two diametrically opposed orientations. By comparison with a single winding, this allows a doubling of productivity and limits the deformations of the preform that the tape tension has a tendency to cause. Quite obviously, if the liner is fairly thick or if the tape tension is very low, it may be preferable to wind just one tape. By contrast, it is possible to elect to wind more than two tapes simultaneously, particularly when the diameter of the tank is great in comparison with the width of tape.

For preference, the axis of the preform 2 is kept horizontal during winding to ensure even distribution of resin along the tank.

Gas, for example air, pressure is preferably maintained inside the preform during winding. This has the effect firstly of keeping the two end pieces pressed axially against the liner and secondly of tensioning the liner to limit the local deformations thereof under the clamping effect of the tapes and to limit the extent to which it sags in the event of uneven tension in the two tapes. An internal pressure of the order of 1 to 3 bar gives good results.

In addition, the chucks 32 and 42 preferably apply axial traction to the end pieces in order axially to tension the liner in order further to limit its potential to sag. For preference, this traction applied to the preform is not a force of set intensity but is aimed rather at giving the preform a precise and repeatable length, a few millimeters greater than its free length (for example 2 to 4 mm of elongation for a tank 1600 mm long).

The internal pressure and/or the axial traction also have the beneficial effect of helping with the torque that can be transmitted from the end pieces to the liner (and hence to the composite wall) and therefore of encouraging the generation of tension in the tapes 15 and 15'. That may be of particular benefit when there is no hooping 63.

Figure 6:
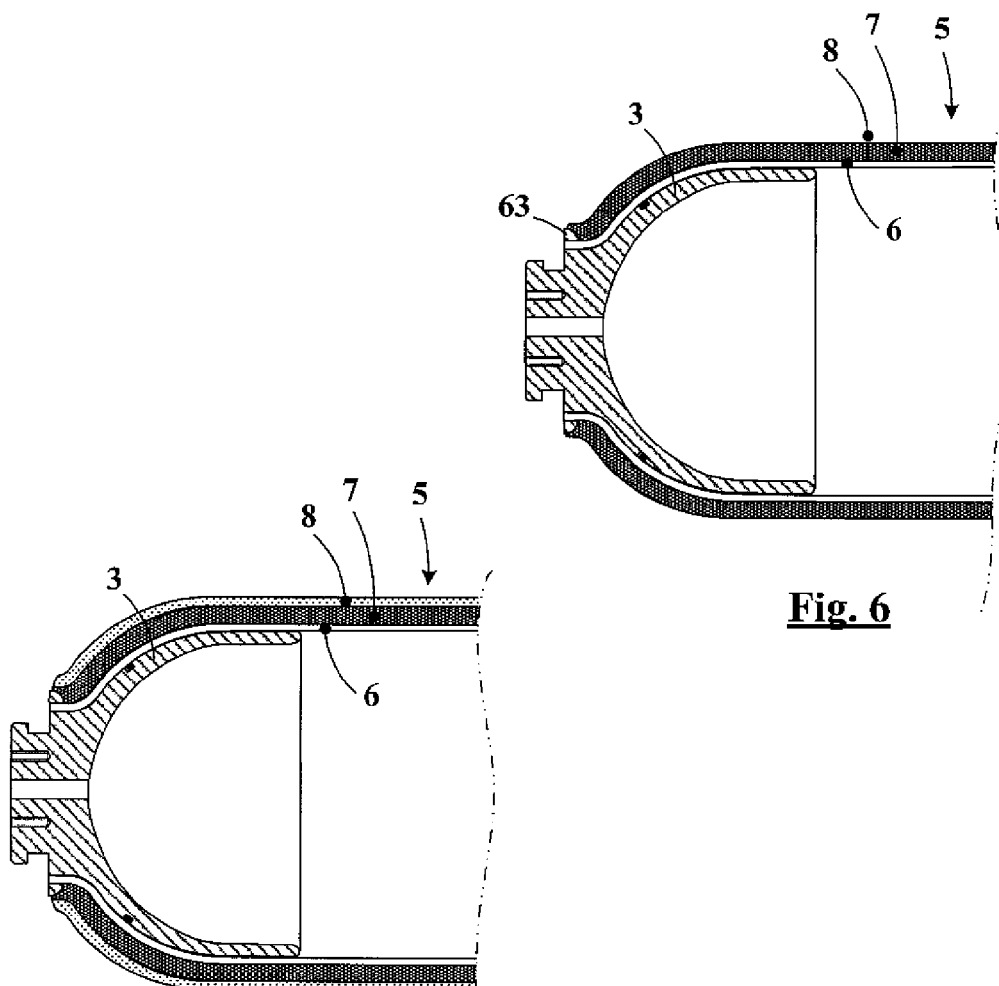
Figure 7:
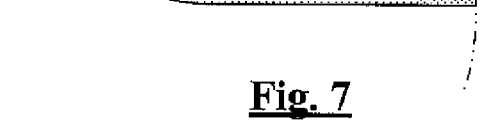
Figure 8:
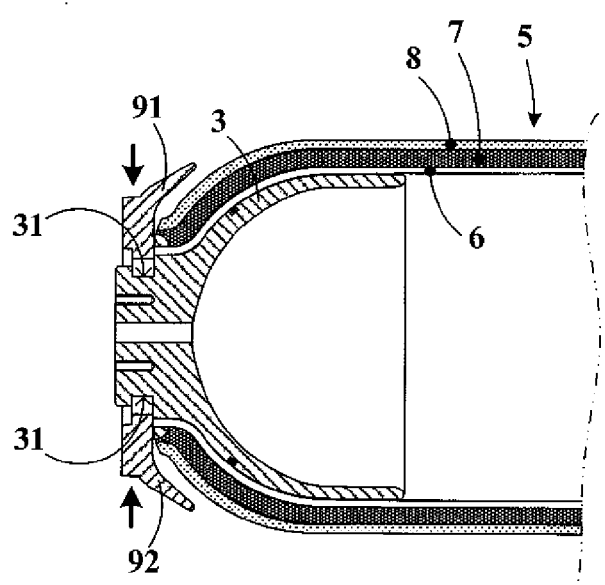

FIGS. 6 to 8 show one end of a tank at various stages of manufacture in cross section, and on a larger scale than in FIGS. 2 to 5.

In FIG. 6, the step that consists in winding the structural layer of carbon fibre 7 onto the liner 6 is complete.

FIG. 7 depicts the result of the next step which is that of winding the exterior protective layer 8 of glass fibre onto the layer of carbon fibre 7. The transition between the carbon winding and the glass winding can be made quite simply by marrying the glass tapes to the carbon tapes. As explained earlier on, it is possible for the structural layer not to have a protective layer.

The fibre tape may be a tape available commercially in reels. Various widths of tape are available according to the number of filaments present in the tape, for the same quality of fibre. The carbon tape may, for example, be a 24K (24000 filament) tape with a linear density of 1600 tex. Its width is about 5 to 6 mm. The glass tape may be of comparable size in 2400 tex.

Once the structural layer, and where appropriate, the protective layer, is/are wound, an optional step may involve eliminating any surplus liquid resin by brushing, scraping, wiping or any applicable method with a view to retaining only the amount of resin that is strictly required. During this step, the chucks (32 and 42) continue to rotate the tank.

For preference, the internal pressure and the rotational movement of the tank are also maintained after the steps described hereinabove until such time as the resin is sufficiently polymerized to guarantee the dimensional stability of the tank.

For preference, the axis of the preform 2 is kept horizontal during the winding or windings and until the resin is sufficiently polymerized to ensure even distribution of resin along the tank.

Once the sufficient level of polymerization is reached, the axial tension and, where appropriate, the internal pressure may be eliminated and this tank can also subsequently be baked for a few hours to complete the polymerization of the resin.

FIG. 8 depicts the optional step during which crescents 91 and 92 are fitted into the groove 31 provided for this purpose on the neck of the end piece 3. The crescents 91 and 92 are then joined together and/or to the end piece 3 (for example using screws) to form a shell ring 9 the utility of which was described hereinabove with reference to FIG. 1.

Figure 9:
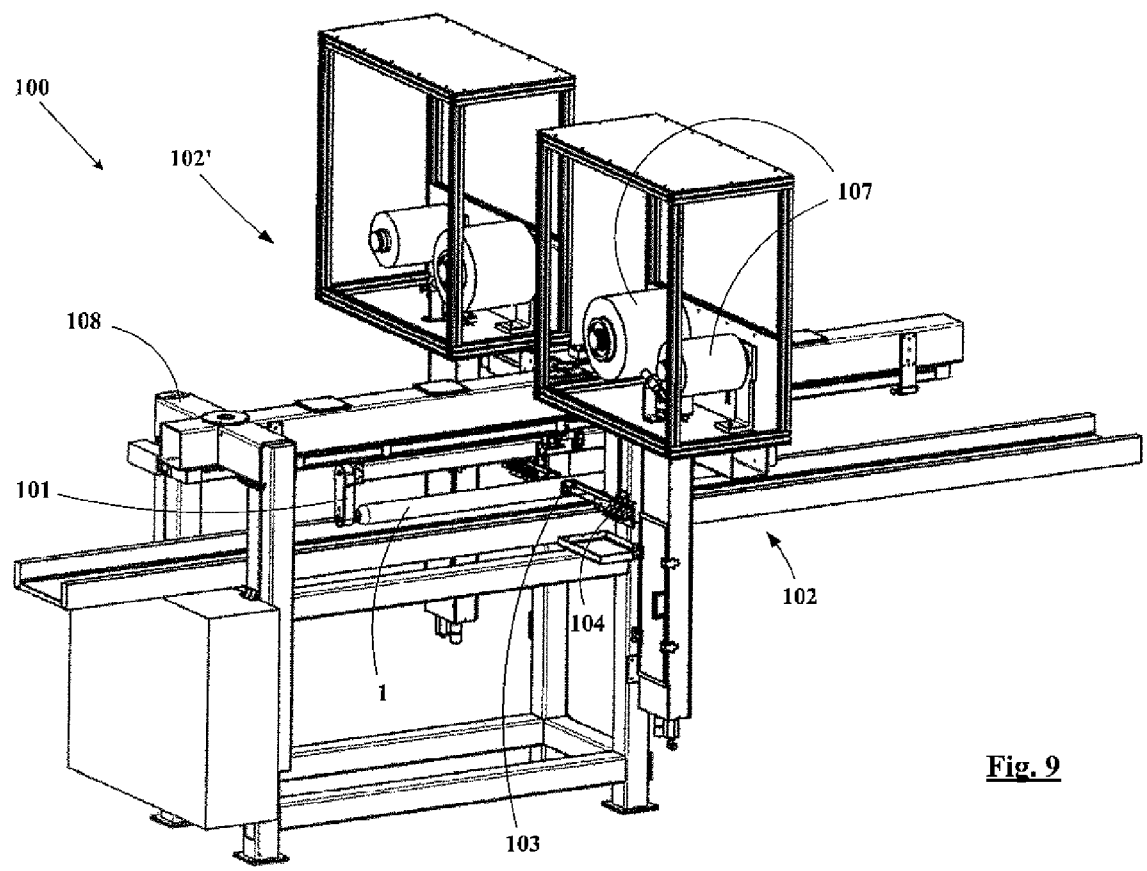
FIG. 9: a general arrangement of an apparatus for manufacturing a tank according to an embodiment of a method of the invention.
Figure 10:
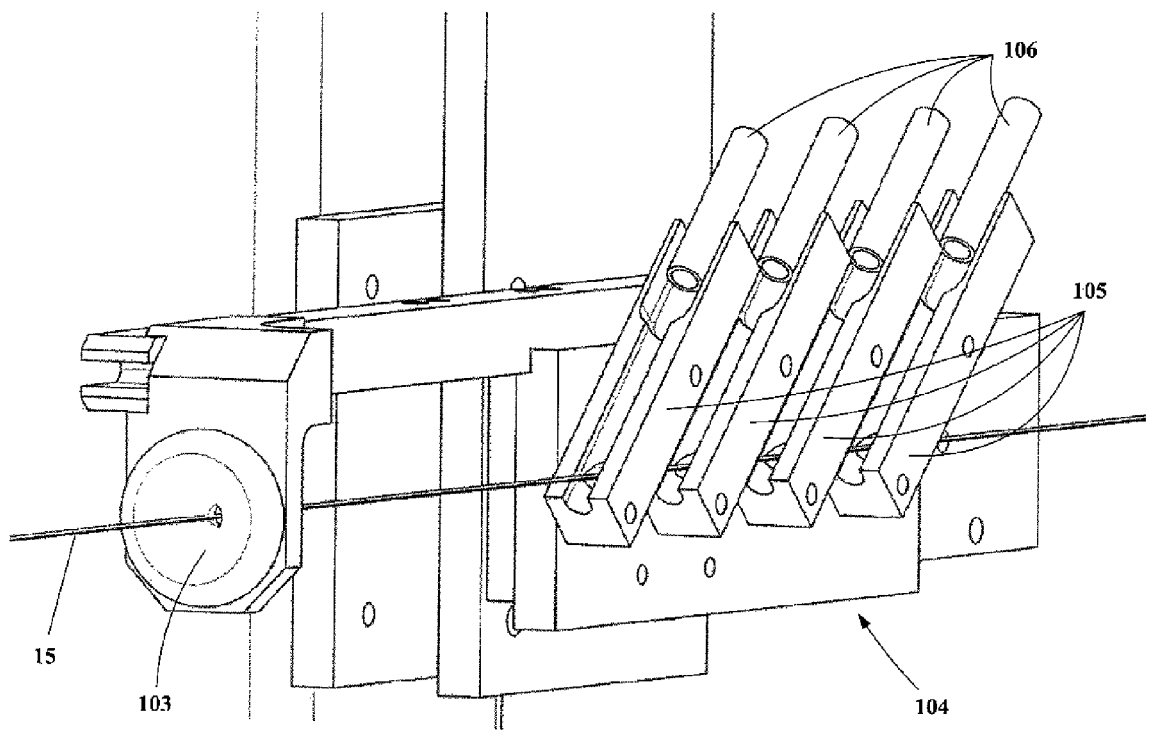
FIG. 10: a detailed view of the apparatus of FIG. 9 in particular showing the means of impregnating the tape.

FIGS. 9 and 10 are views of an apparatus for winding the tapes and for (at least partially) polymerizing a tank according to the method of the invention.

FIG. 9 is a general arrangement of the apparatus 100. The tank preform 1 is held by its end pieces using a rotary support 101. The support comprises means of rotating the preform about its axis kept horizontal. For preference, the support comprises a compressed air supply connected by a rotary seal to the end piece (3) of the preform so as to be able to maintain a controlled pressure inside the preform during winding.

The apparatus comprises a feed device 102 for feeding tape under controlled tension. For preference, the tension is generated in a way known per se under the action of a counterweight acting on a loop of tape, the tape being paid out from the tape reels 107 in a regulated way so as to keep the counterweight active. A tension of a few daN, for example of 4 daN, is suitable.

FIG. 10 is a detailed view more particularly showing the emergence of the tape 15 from the feed device. This outlet comprises an eyelet 103 which guides the tape so that it can be wound onto the preform. Before reaching the eyelet 103, the tape is impregnated with liquid resin by an impregnation device 104. The impregnation device may comprise one or, as here, several cascades 105 fed with liquid resin by ducts 106 and arranged in such a way that the tape passes through them. The flow rate of resin supplied to the cascades can be controlled by a positive displacement pump, for example a peristaltic pump known per se and not depicted here. Impregnating the tapes using a cascade avoids any rubbing or flexing of the fibres, and this has a beneficial effect as to their mechanical strength. In addition, apparatus maintenance and cleaning are easier. The resin that flows from the cascades can be collected and possibly filtered before being returned to the cascades.

Once they have been impregnated with resin, the tapes have only the eyelet 103 as their point of contact with the apparatus, making the apparatus even simpler to maintain.

It will be appreciated that the rotary support 101 is able to move in relation to the feed device 102 in a direction parallel to the axis of the tank preform so as to allow the tape 15 to be wound progressively through outward and return movements coordinated to the rate of rotation of the rotary support 101, that is to say to the rate of rotation of the preform. The means for moving the support comprise, for example, a gear motor unit driving a toothed belt to which the support is connected. Conversely, the rotary support could be stationary and the eyelet could then be able to move axially, with or without an axial movement of the impregnation device.

For preference, a second feed device 102' is positioned facing the first, on the other side of the apparatus in relation to the rotary support 101, so as to provide the second tape 15' symmetrically in relation to the first tape 15. Thus, each feed device supplies its liquid resin impregnated fibre tape independently of the other, under controlled tension. As stated hereinabove, it is possible to conceive of winding more than two tapes simultaneously, in which case it is preferable to provide a corresponding number of independent feed devices.

The invention claimed is:

1. A method of manufacturing a tank of cylindrical overall shape of round cross section for the storage of high-pressure fluid, the tank comprising, about an axis, a liner and a structural layer, the method comprising steps successively involving:
   placing metal end pieces inside a tube intended to form the liner;
   shaping the ends of the tube to the exterior shape of the end pieces by locally reducing the diameter of the tube to form a preform; and
   winding at least one tape of fibre impregnated with thermosetting resin around the liner to form the structural layer of the tank.

2. The method according to claim 1, further comprising placing elastomer seals in annular grooves of the radially exterior surface of the end pieces facing the tube intended to form the liner.

3. The method according to claim 1, further comprising placing hooping around the ends of the tube which are formed over the end pieces.

4. The method according to claim 1, further comprising winding a second tape of fibre impregnated with thermosetting resin around the structural layer to form a protective outer layer of the tank.

5. The method according to claim 4, wherein the second tape of fibres is married up with the first tape of fibres.

6. The method according to claim 1, wherein an internal pressure is maintained in the volume of the preform consisting of the liner and of the end pieces while the tape is being wound.

7. The method according to claim 1, wherein axial traction is maintained on the preform consisting of the liner and of the end pieces while the tape is being wound.

8. The method according to claim 1, wherein two tapes are simultaneously wound substantially symmetrically with respect to the axis of the preform consisting of the liner and of the end pieces.

9. The method according to claim 1, wherein, in order to preform the winding, the preform consisting of the liner and of the end pieces is rotated about its axis, the preform being held by the end pieces, the at least one tape being guided by a mobile means able to move parallel to the axis of the preform.

10. The method according to claim 9, wherein the axis of the preform is kept substantially horizontal during winding.

* * * * *